(12) United States Patent
von Möllendorff et al.

(10) Patent No.: US 12,498,061 B2
(45) Date of Patent: Dec. 16, 2025

(54) DEVICE FOR THE DETACHABLE CONNECTION OF A FIRST TUBULAR COMPONENT AND A SECOND TUBULAR COMPONENT

(71) Applicant: TrueDyne Sensors AG, Reinach (CH)

(72) Inventors: Ragnar von Möllendorff, Grenzach-Wyhlen (DE); Gebhard Gschwend, Allschwil (CH); Hanno Schultheis, Lörrach (DE)

(73) Assignee: TrueDyne Sensors AG, Reinach (CH)

( * ) Notice: Subject to any disclaimer, the term of this patent is extended or adjusted under 35 U.S.C. 154(b) by 0 days.

(21) Appl. No.: 18/811,941

(22) Filed: Aug. 22, 2024

(65) Prior Publication Data
US 2025/0067371 A1    Feb. 27, 2025

(30) Foreign Application Priority Data
Aug. 25, 2023    (DE) ...................... 10 2023 122 905.2

(51) Int. Cl.
     *F16L 19/00*      (2006.01)
     *F16L 37/14*      (2006.01)

(52) U.S. Cl.
     CPC ........... *F16L 19/005* (2013.01); *F16L 37/144* (2013.01)

(58) Field of Classification Search
     CPC .................................................. F16L 19/005
     See application file for complete search history.

(56) References Cited

U.S. PATENT DOCUMENTS

| | | | | |
|---|---|---|---|---|
| 4,431,218 | A * | 2/1984 | Paul, Jr. | F16L 37/144 |
| 5,964,483 | A * | 10/1999 | Long | F16L 37/144 |
| 6,293,596 | B1 * | 9/2001 | Kinder | F16L 37/144 |
| 9,777,876 | B2 * | 10/2017 | Kaneko | F16L 37/144 |
| 11,262,011 | B1 * | 3/2022 | Dias | F16L 37/0915 |
| 2013/0014963 | A1 * | 1/2013 | Porta | F16L 37/144 |
| 2013/0161941 | A1 * | 6/2013 | Zulauf | F16L 19/005 |

FOREIGN PATENT DOCUMENTS

| | | | | |
|---|---|---|---|---|
| CN | 111271533 A | * | 6/2020 | ............ F16L 37/144 |
| DE | 202017105078 U1 | | 1/2019 | |
| KR | 101845924 B1 | | 4/2018 | |

* cited by examiner

*Primary Examiner* — Zachary T Dragicevich
(74) *Attorney, Agent, or Firm* — Mark A. Logan; Endress+Hauser (USA) Holding, Inc.

(57) ABSTRACT

A device for the detachable connection of a first tubular component and a second tubular component, wherein the first tubular component has a flange-like thickening in an end region facing the second component, wherein a screw nut is provided as the second tubular component which is dimensioned such that the inner opening of the screw nut can be applied over the flange-like thickening onto the first tubular component, wherein two passages located radially next to one another are provided in the outer wall of the screw nut, and wherein a flat, clamp-shaped holding component is provided, having two inner brackets corresponding to the two passages of the screw nut so that the two inner brackets can be pushed into the passages of the screw nut. The screw nut is fastened to the first component in connection with the flange-like thickening of the first component.

9 Claims, 3 Drawing Sheets

DEVICE FOR THE DETACHABLE CONNECTION OF A FIRST TUBULAR COMPONENT AND A SECOND TUBULAR COMPONENT

CROSS-REFERENCE TO RELATED APPLICATION

The present application is related to and claims the priority benefit of German Patent Application No. 10 2023 122 905.2, filed on Aug. 25, 2023, the entire contents of which are incorporated herein by reference.

TECHNICAL FIELD

The present disclosure relates to a device for the detachable connection of a first tubular component and a second tubular component.

BACKGROUND

The Mini-Coriolis FLT-M1 with an S-shaped measuring tube and a temperature sensor is, for example, used for the highly precise measurement of the flow of small flowing quantities of gases or liquids through a pipeline. The measuring device is installed directly into the pipeline on the customer side via a manufacturer-specific connection. It is designed so that it determines the flow using the Coriolis effect. For this purpose, vibration exciters and vibration sensors are suitably fastened to the S-shaped curved measuring tube. The temperature sensor is used to compensate for temperature effects. The S-shaped measuring tube is fastened onto a plate, which serves to dampen external vibrations. A compact and hermetically sealed metal housing likewise serves to protect the measuring system from external interfering influences. The flow meter can be used in combination with a pump and/or a valve to control the flow in a pipeline.

For the customer-specific fluidic connection to a pipeline, the above-described flow meter has a correspondingly small-sized connection piece with a metal flange, which is attached to a solid stainless steel block by means of clamps, on the inlet pipe and on the outlet pipe. The disadvantage of this solution is the high material consumption, which makes the known connection solution relatively expensive. Furthermore, the known solution is not designed to be reversible.

Another known solution is to apply a union nut onto the connection piece at the inlet region or outlet region of the flow meter before attaching the flange. After final assembly, this connection can no longer be replaced without destroying material: It also cannot be subsequently attached on the customer side; given a defective thread of the screw nut or the like, subsequent replacement is likewise no longer possible. In addition, the screw nut is in the way when welding the flange to the inlet or outlet connection piece of the measuring device. It is therefore necessary to make the connection piece considerably longer than the screw nut, which results in a longer, undesirable connection.

SUMMARY

The present disclosure is based on the object of proposing a cost-effective device for the detachable connection of a first tubular component and a second tubular component.

The object is achieved by a device for the detachable connection of a first tubular component and a second tubular component, wherein the first tubular component has a flange-like thickening in its end region facing the second component, wherein a screw nut is provided as the second component which is dimensioned such that the inner opening of the screw nut can be applied over the flange-like thickening onto the first tubular component, wherein two recesses located radially next to one another are provided in the outer wall of the screw nut, wherein a flat, clamp-like holding component is provided which has two inner brackets which are designed to correspond to the two recesses of the screw nut so that the two inner brackets can be pushed into the recesses of the screw nut and, in the assembled state, at least partially enclose the first tubular component, whereby the screw nut is fastened to the first component in connection with the flange-like thickening of the first component.

The device according to the present disclosure for the detachable connection of two tubular components is a standard solution that makes a simple and cost-effective fluidic connection of two tubular components possible. If the first component is the inlet pipe or outlet pipe of a flow meter, in particular a Coriolis flow meter, the measuring device can be easily installed in a pipeline on the customer side by means of the detachable connection and can also be removed again if necessary. Of course, it is also possible to use the flange flexibly with or without a union nut.

At the end, as already described, a flange is adapted to the tubular component; in particular, this flange is welded on. According to an advantageous, cost-effective embodiment, the second tubular component is a screw nut, in particular a standard VCO™. VCO is a trademark registered to the Swagelok Company of Solon, Ohio for a metal tube fitting having an O-ring face seal. The acronym VCO signifies Vacuum Coupling O-ring. The size of the flange and the inner opening of the screw nut are coordinated with one another, they are complementary so to speak: The screw nut can be pushed over the flange onto the first tubular component, for example after mounting the first tubular component on a measuring device or a pipeline. This is very advantageous, for example, in the construction of a measuring device, in particular a Coriolis meter, since it allows the tubular component to be firmly connected, in particular welded, to the inlet region and/or outlet region of the measuring device without the screw nut being a hindrance during the welding process. The first tubular component can therefore be designed short, which is advantageous for the stability of the structure. Preferably, the minimum length is slightly larger than the longitudinal extent of the screw nut or of the second tubular component.

In order to detachably and frictionally connect the second tubular component, e.g., the screw nut, to the first tubular component, e.g., a tubular connection piece with an adapted flange in the free region at the end, the second tubular component has recesses through which the clamp-shaped component or the clamp, in particular a metal clamp, can be pushed onto the first tubular component. This construction is reversible so that the clamp can be removed again if necessary. The dimensions of the clamp are selected such that the two inner brackets of the clamp abut against the outer surface of the first tubular component in the assembled state, whereby the second tubular component is laterally fixed to the first tubular component. The longitudinal fixation is achieved in the assembled state by the 'upper' edge of the screw nut abutting against the flange of the first tubular component.

According to an advantageous development of the device, the clamp-shaped holding component furthermore has two outer brackets, wherein each of the two outer brackets is arranged substantially parallel to one of the two inner brackets. While the inner brackets abut in the outer region of the first tubular component in the assembled state, the inner surfaces of the two outer brackets abut against the outer wall of the screw nut. This coordinated design allows the second tubular component to be centered relative to the first tubular component. This is of great importance if, for example, a seal is arranged between the corresponding end regions of the first tubular component and a subsequent pipeline on the customer side.

In order to ensure that the inner brackets are in contact with the first tubular component and the outer brackets are in contact with the second tubular component in the assembled state, it is proposed according to a development of the present disclosure to design the inner brackets and the outer brackets such that they have a predetermined lateral resilience. This can be achieved, for example, by providing material cutouts in the inner and/or outer brackets in the regions in which stresses occur in the event of lateral bending in the plane of the flat, clamp-shaped holding component. Preferably, the material cutouts in the inner brackets and/or the outer brackets are located near the connecting surface into which the inner brackets and the outer brackets merge. Other embodiments for making the brackets resilient are known to a technically qualified person from the prior art.

In order to optimize the friction-locked contact of the clamp-shaped holding component on the second tubular component, in particular the screw nut, the inner edge of the connecting surface of inner brackets and outer brackets comprises a formation that is designed to substantially correspond to a partial region of the outer surface of the screw nut.

In order to simplify assembly and disassembly, according to an advantageous development, the clamp-shaped holding component has a recess designed as a gripping element in the inner region of the connecting surface of inner brackets and outer brackets. This effectively prevents fingers from slipping off during assembly or disassembly.

In addition, it is considered advantageous in connection with the solution according to the present disclosure if the clamp-shaped holding component is made of a spring steel.

As already mentioned above, a standardized VCO™ screw, in particular a VCO™ hexagon screw, is preferably used as the second tubular component.

The other embodiments of the present disclosure also have already been mentioned above:

In an end region facing away from the flange-like thickening, the first tubular component is non-detachably connected flush to an end region of an inlet or of an outlet of a flow meter.

Preferably, the flow meter is a flow meter using the Coriolis effect, in particular a mini-Coriolis flow meter.

Alternatively, the first tubular component is non-detachably connected flush to a pipeline in an end region facing away from the flange-like thickening.

BRIEF DESCRIPTION OF THE DRAWINGS

The present disclosure is explained in greater detail with reference to the following figures. In the figures.

DETAILED DESCRIPTION

Figure 1A:
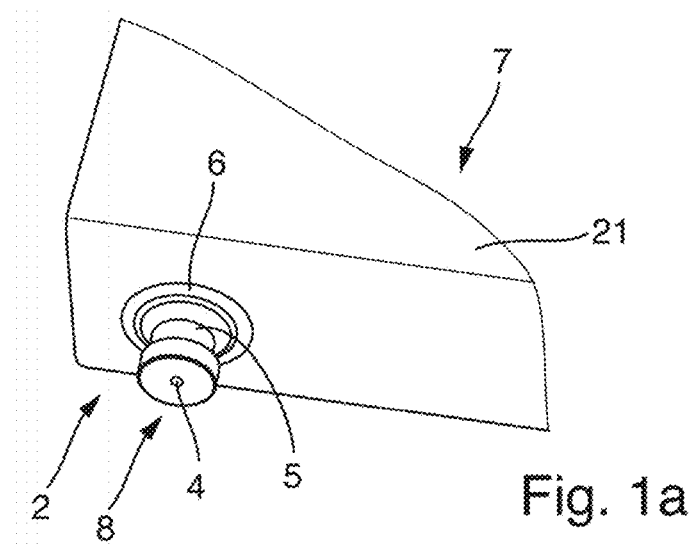
FIGS. 1a-1f show three-dimensional views of the components of an embodiment of the device according to the present disclosure, partially in exploded view.
Figure 1B:
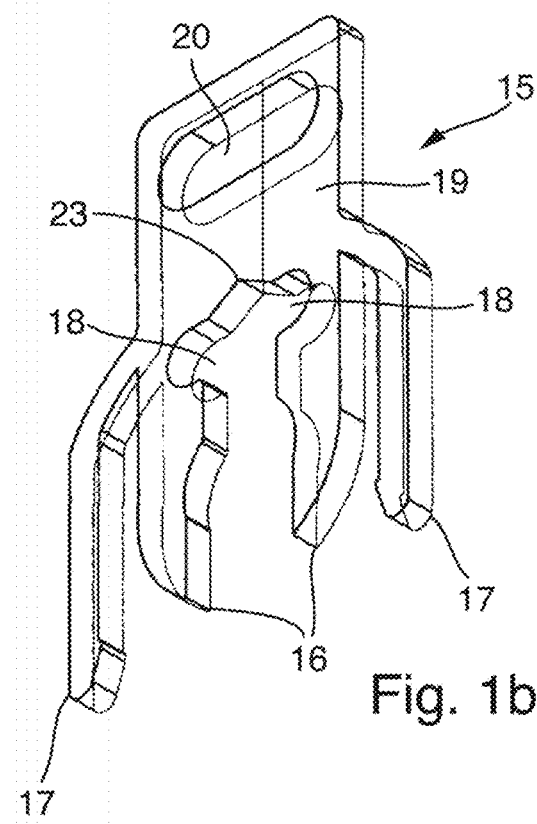
Figure 1C:
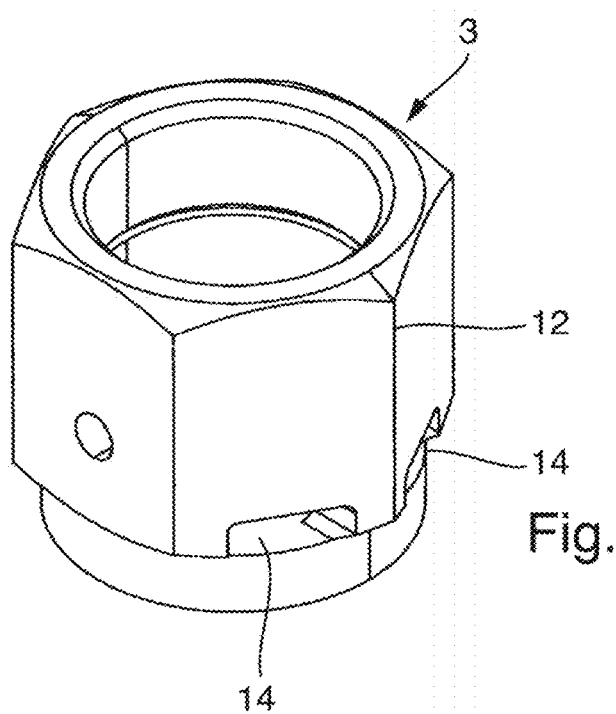
Figure 1D:
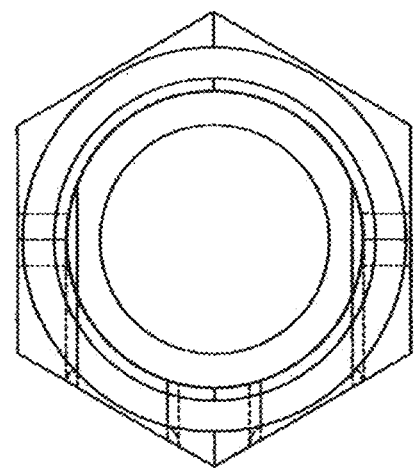
Figure 1E:
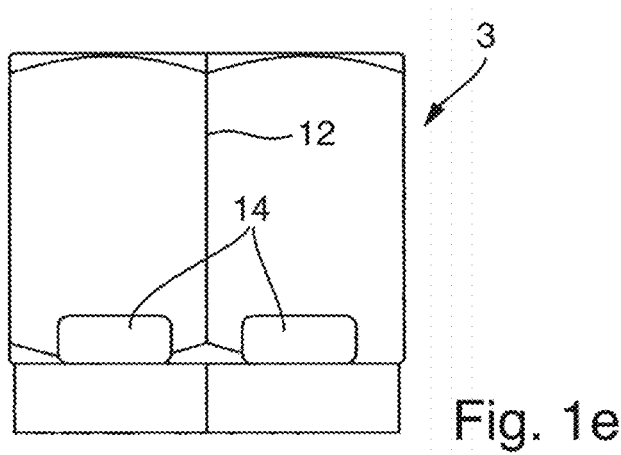
Figure 1F:
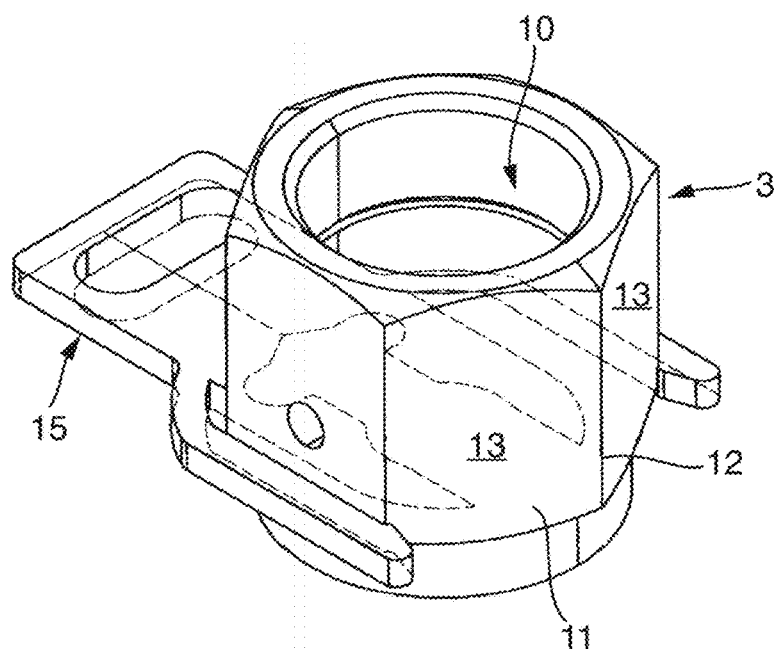
Figure 2:
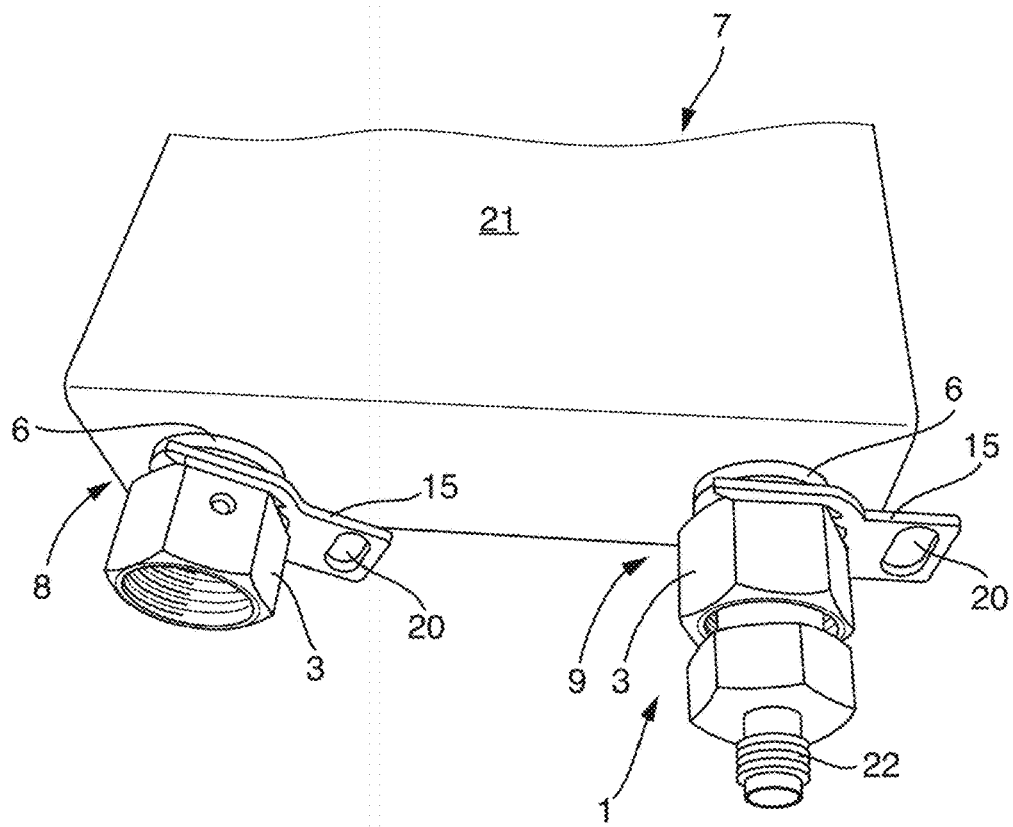
FIG. 2 shows the components shown in FIG. 1 of the embodiment of the device according to the present disclosure when mounted on a flow meter.

FIGS. 1a-1f show the individual components of an embodiment of the device according to the present disclosure. FIG. 2 shows the components shown in FIGS. 1a-1f of the embodiment of the device according to the present disclosure when they are mounted on a flow meter 7. The figures in particular show the assembly for a Coriolis flow meter 7, the measuring components of which are arranged in the housing 21.

In the shown case, the first tubular component 2 is the outlet connection piece 5 or the inlet connection piece 5 of the Coriolis flow meter 7. The inlet and outlet connection pieces 5 are firmly connected to the housing 21 of the flow meter 7, usually by means of a weld seam 6.

The connection piece 5 at the inlet region and the connection piece 5 at the outlet region of the flow meter 7 each have a flange-like thickening 4 or a flange 4 in their free end regions. The second tubular component 3 is a screw nut (FIG. 1c, FIG. 1d, FIG. 1e), which in this case is a standardized VCO™ hexagon screw nut 3. The diameter of the inner opening 10 of the screw nut 3 is larger than the diameter of the flange-like thickening 4; therefore, after mounting the inlet or outlet connection piece 5 on the housing 21 of the flow meter 7, the screw nut 3 can be easily pushed over the flange 4 onto the inlet or outlet connection piece 5. This is important since the screw nut 3 is not a hindrance while welding the connection piece 5 to the housing 21 of the flow meter 7.

Consequently, the length of a connection piece 5 can be dimensioned such that it is only slightly greater than the length of the screw nut 3, which advantageously increases the stability of the connection of the flow meter 7 to a customer-specific pipeline (not shown). The advantage of using a VCO™ screw nut 3 is furthermore clearly that a wide variety of different adapters 22 exists for the VCO™ standard so that there is great flexibility in terms of the connection on the customer side.

Two slot-shaped passages 14 located radially next to one another are introduced into the outer wall of the standardized screw nut 3. The passages 14 are located in the lower region of two side surfaces 13 of the screw nut 3 that lie next to one another. The passages 14 are selected and arranged such that they do not substantially impair the stability of the screw nut 3. For the purpose of frictionally connecting the inlet connection piece 5 or outlet connection piece 5 to the screw nut 3, a suitably designed clamp-shaped holding component 15 is inserted through the passages 14 (FIG. 1f). Preferably, the flat, clamp-shaped holding component 15 is made of spring steel.

The clamp-shaped holding component 15 (FIG. 1b) has two inner brackets 16 which are designed to correspond to the two passages 14 in the outer wall 11 of the screw nut 3 so that the two inner brackets 16 can be pushed into the passages 14 of the screw nut 3 and, in the assembled state, contact the first tubular component 2. As a result, the screw nut 3 is laterally/radially frictionally connected to the first component 2. The flange-like thickening 4 also achieves the frictional longitudinal connection of the two tubular components 2, 3. For centering purposes, two outer brackets 17 are furthermore found on the clamp-shaped holding component 15, wherein each outer bracket 17 is arranged substantially parallel to each inner bracket 16. In the assembled state, the outer brackets 17 contact the outer wall 11 of the screw nut 3.

The inner brackets 16 and the outer brackets 17 have a common connecting surface 19. In order to ensure the contact between the inner brackets 16 and the connection piece 5 and between the outer brackets 17 and the screw nut 3, the inner brackets 16 and/or the outer brackets 17 are designed laterally resilient. How this resilience can be designed is well known from the prior art to a technically qualified person. In the shown variant, material cutouts 18 are provided in the inner brackets 16 in the regions in which stresses occur in the event of lateral bending in the plane of the flat, clamp-shaped holding component 15. Preferably, the material cutouts 18 are located near the connecting surface 19 into which the inner brackets 16 and the outer brackets 17 merge. The clamp-shaped holding component 15 is preferably manufactured from a spring plate. In this case, it is thus a metal clamp 15.

In the region which, in the assembled state, faces the outer wall 11 of the screw nut 3, the connecting surface 19 of inner brackets 16 and outer brackets 17 comprises a formation 23 which is complementary to a partial region of the outer wall 11 of the screw nut 3. In the shown case, the formation 23 is jagged and, in the assembled state, contacts the screw nut 3 on two side surfaces 13 located next to one another, and on the connecting edge 12. This effectively prevents the metal clamp 15 from twisting with respect to the screw nut 3; the metal clamp 15 has no "play" or the "play" approaches zero.

The clamp-shaped holding component 15 has a recess 20 within the connecting surface 19 of inner brackets 16 and outer brackets 17. This recess 20 results in an improved holding function: It inhibits/prevents the fingers from slipping off the metal clamp 15 during assembly or disassembly.

The invention claimed is:

1. A device, comprising:
   a first tubular component having a flange in an end region;
   a second tubular component embodied as a screw nut, wherein the screw nut has an inner diameter greater than an outer diameter of the flange of the first tubular component such that the screw nut can be applied over the flange onto the first tubular component, wherein the screw nut has two parallel passages located on chords through an outer wall of the screw nut; and
   a clamp having:
      two parallel inner brackets that correspond to the two passages of the screw nut;
      two parallel outer brackets that are parallel with the inner brackets; and
      a connecting surface that connects the two inner brackets and the two outer brackets, the two inner brackets and the two outer brackets merging into the connecting surface,
      wherein the inner brackets, the outer brackets, and the connecting surface are co-planar,
   wherein, in an assembled state, the two inner brackets are inserted into the two passages of the screw nut and engage the first tubular component behind the flange, the two outer brackets engage an outer surface of the screw nut, and the screw nut is thereby fastened to the first tubular component in connection with the flange of the first tubular component.

2. The device according to claim 1, wherein the two inner brackets and the two outer brackets are designed to have a predetermined lateral resilience.

3. The device according to claim 1, wherein, in the region which, in the assembled state, faces the outer wall of the screw nut, the connecting surface of inner brackets and outer brackets has a formation which is designed complementary to a partial region of the outer wall of the screw nut.

4. The device according to claim 1, wherein the clamp has a recess within the connecting surface of inner brackets and outer brackets.

5. The device according to claim 1, wherein the clamp is made of a spring steel.

6. The device according to claim 1, wherein the screw nut has female threads and is embodied to accept a male tube fitting having an O-ring face seal.

7. The device according to claim 1, wherein, in an end region facing away from the flange, the first tubular component is non-detachably connected flush to an end region of an inlet region or of an outlet region of a flow meter.

8. The device according to claim 7, wherein the flow meter is a Coriolis flow meter for determining a process variable of a flowing medium.

9. The device according to claim 1, wherein, in an end region facing away from the flange, the first tubular component is non-detachably connected flush to a pipeline.

* * * * *